March 21, 1967     T. C. BARTEE     3,309,793
DIGITAL COMPUTER TRAINER

Filed Nov. 30, 1964     3 Sheets-Sheet 1

INVENTOR.
THOMAS C. BARTEE
BY
Kenway, Jenney & Hildreth
ATTORNEYS

INVENTOR.
THOMAS C. BARTEE

United States Patent Office 3,309,793
Patented Mar. 21, 1967

3,309,793
DIGITAL COMPUTER TRAINER
Thomas C. Bartee, Lexington, Mass., assignor to Hickok Teaching Systems, Inc., Cambridge, Mass., a corporation of Ohio
Filed Nov. 30, 1964, Ser. No. 414,639
5 Claims. (Cl. 35—10)

My invention relates to training apparatus, and particularly to a novel trainer for teaching the fundamentals of the construction and operation of information processing apparatus such as digital computers and other digital machines.

The increasing use of electronic digital information processing apparatus has created a growing demand for personnel capable of manufacturing, designing and maintaining such apparatus. The object of my invention is to facilitate the training of such personnel.

Various approaches to the training of personnel for manufacturing, designing and maintaining digital equipment have been employed, depending on the technical background of the trainee as well as the extent of the knowledge he will need to acquire in order to perform the function for which he is being trained. The diverse requirements of students of different backgrounds and the need to train students for work on particular machines necessitates some specialization in training, and retraining will continue to be needed as improved components and techniques are developed. However, if each student can be taught to understand the basic logical principles underlying all digital computers, and to know the construction and operation of the basic circuits and circuit combinations employed at his own technical level, his orientation of this understanding and knowledge to a particular machine or to new modes of circuit construction or connection will manifestly be simplified. The training apparatus of my invention is adapted for use in imparting this basic information to classes or individuals in a step-by-step graphic manner leading from the illustration of a single step in the operation of a single circuit to a comprehensive demonstration of the high-speed operation of a complex system. A particular advantage of the apparatus is that it may be used for demonstration and instruction at any technical level, so that the same apparatus may be used to train operators, technicians, and design engineers.

Basically, the training apparatus of my invention comprises a display panel on which a selected set of logic circuits are represented in block diagram form. These circuits comprise a sufficient set of the usual gating and memory circuits employed in digital apparatus to make up any of the conventional data processing sub-assemblies such as shift registers, code converters, accumulators, and the like. A jack is mounted adjacent to representations of the input and output terminals of each of the circuits, such that the various circuits may be both graphically and electrically interconnected by patch cords. A number of indicator lamps are also located on the panel, the lamps being identified by indices associating them with different circuits depicted on the panel. Physical circuits corresponding to the diagrams on the display panel are mounted on printed circuit cards, which are detachably secured in conventional racks mounted adjacent to the display panel. Corresponding terminals of these circuits are connected to the jacks on the display panel. A multivibrator oscillator is provided for producing clock pulses to provide timing for the circuits set up on the display panel, and the oscillator is provided with means for producing any of a group or output pulse rates, including a high rate simulating a practical clock pulse rate, and at least one rate sufficiently low that it is countable by a human observer, so that the operation of the apparatus may be followed by observing the pattern of energization of the indicator lamps. Switching means are provided for selectively connecting the oscillator to trigger a selected set of the circuits represented on the display panel, or for connecting these circuits to a manually operable push-button for one-step operation. The apparatus includes an external breadboard, of conventional design, on which external circuits may be assembled, and means are provided for connecting breadboarded circuits to the circuits displayed on the panel. In operation, the apparatus may be used to explain and illustrate the operation of digital circuits and circuit combinations at any desired technical level and without a preliminary understanding by the student of the apparatus as a whole. This capability suits the trainer for use by students of widely varying technical background. When a single circuit or a group of circuits has been set up by the student on the display panel by the use of patch cords, operation of the circuit may be made to occur one step at a time, so that the student can follow the description of a particular step without the necessity for understanding the operation as a whole. Operation may then be caused to occur at a sufficiently slow rate that an operating cycle may be observed. The apparatus may then be caused to operate at a normal frequency, and the operation observed on an oscilloscope.

The apparatus of my invention, and its mode of operation, will best be understood from the following detailed description, together with the accompanying drawings, of a preferred embodiment thereof.

Figure 1:
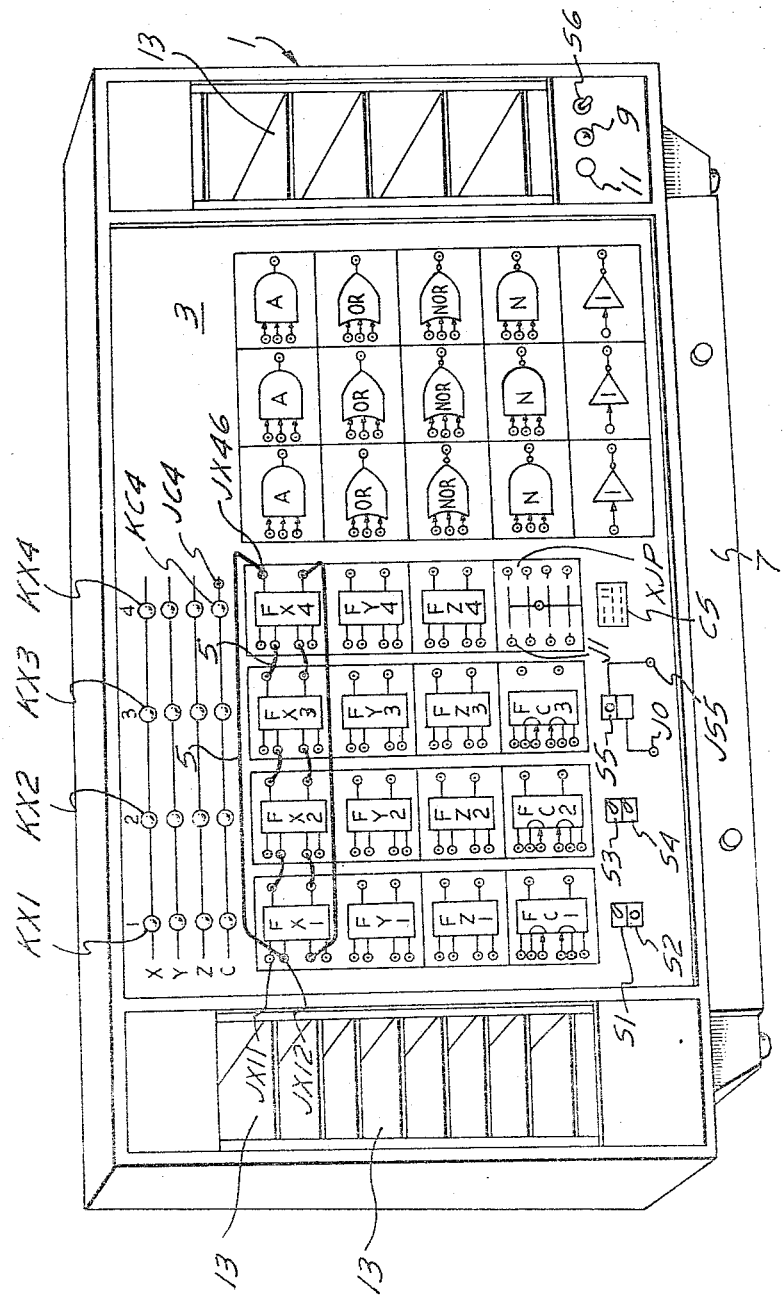
FIG. 1 is a perspective sketch of training apparatus in accordance with my invention.

Referring first to FIG. 1, the training apparatus of my invention is housed in a cabinet generally designated as 1, having a display panel 3 at the front of which a group of logic circuits are depicted and on which indicating lamps, jacks, and controls are mounted. The circuit diagram representations are inscribed in any suitable manner, as by painting or the like, and in the form of any selected set of conventional circuit symbols. If desired, overlay panels may be provided bearing block diagrams identifying the circuits in accordance with different conventions. As shown in FIG. 1, the preferred embodiment includes representations of three conventional AND gates A, three conventional OR gates OR, three conventional NOR gates NOR, three conventional NAND gates N, and three conventional inverters I. Although various other conventions could obviously be employed, these gates are assumed to perform the logic functions indicated in, for instance, negative logic in which a logic 1 is represented by a minus voltage and a logic 0 is represented by ground potential or 0 volts. Four sets of flip-flops are also represented on the panel. These include the flip-flops FX1 through FX4, FY1 through FY4, FZ1 through FZ4, FC1, FC2 and FC3. Each of the X, Y and Z flip-flops are represented as having four input terminals and two output terminals. The C flip-flops are represented as having six input terminals and two output terminals. The input and output leads of all the circuits on the panel 3 are represented as terminating at the locations of conventional jacks mounted on the panel, such as the jack JX11 associated with the upper input terminal of the flip-flop FX1. Each jack has a single conductor internally connected, in a manner to be described, to the corresponding terminal of a physical circuit corresponding to the circuit represented on the panel, and adapted to be connected to any other jack on the panel by means of a patch cord, such as the patch cord 5 interconnecting the jacks JX12 and JX46. Such a patch cord may comprise a conventional flexible conductor with a single conductor plug at each end.

Associated with each of the flip-flops depicted on the display panel is an indicator lamp mounted on the panel in an array identified by indicia on the panel associating it with the flip-flop to which it is connected. As will appear, these lamps are internally connected to the physical circuits represented by the circuits depicted on the panel in such a manner that when the corresponding flip-flop is set to logic 1 the lamp will be lit. As shown, the lamps are arranged in four columns labelled 1, 2, 3 and 4 and in four rows labelled X, Y, Z and C. Accordingly, a lamp such as KX1 corresponds to a flip-flop FX1, and so forth. The lamp KC4 is a spare, and is mounted adjacent to a jack JC4, to which it is electrically connected via a light amplifier circuit, and by means of which it may be operated by the output from any desired jack on the panel 3.

Figure 2:
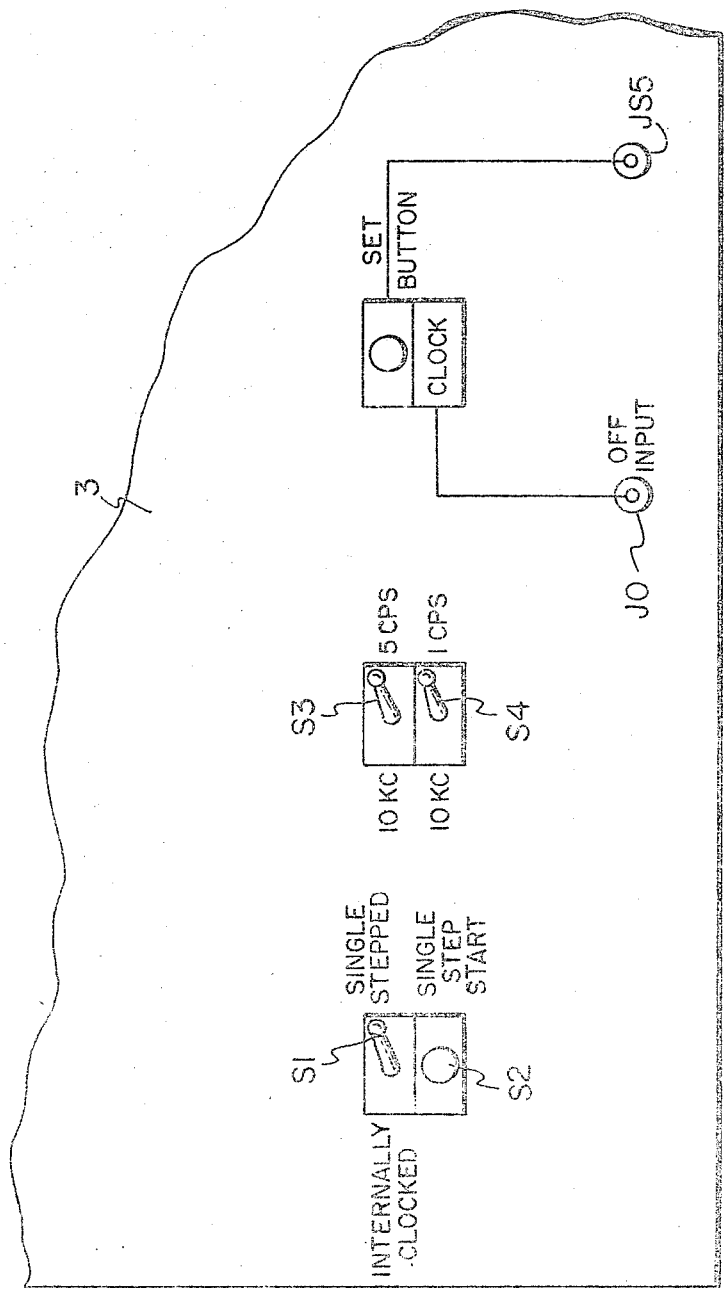
FIG. 2 is a fragmentary view on an enlarged scale of a portion of the apparatus of FIG. 1.

Also mounted on the panel 3 is a switch S1, having a first position labelled "internally clocked" and a second position labelled "single stepped," as best shown in FIG. 2. The switch S1 is connected in a manner to be described to set the apparatus for either automatic and periodic operation, or manual step-by-step operation. A push-button S2, of the spring-returned type, is mounted adjacent the switch S1. As will appear, when depressed and then released, this switch will cause a single clock pulse to be provided to step the registers. Third and fourth switches S3 and S4 are mounted adjacent to each other, each provided with two positions and interconnected in a manner to appear to select one of three operating frequencies for the apparatus. Next to the switch S5 is a jack labelled JS5, together with indicia graphically connecting the jack with the switch S5 and the label "set button" to identify the function of the switch. A block below the switch S5 is inscribed on the board and labelled "clock," and is associated with indicia graphically connecting it with the jack J0, labelled "off input." At the right of the panel is a main switch S6, having one position labelled "power on" and a second position labelled "off." Preferably, a conventional indicating lamp 9 is connected in series with the power switch S6 to indicate when the apparatus is operating, and an externally replacement fuse 11 is mounted adjacent the lamp 9.

On either side of the display panel 3 are conventional printed circuit connector racks in which are detachably mounted printed circuit cards 13. On these printed circuit cards are mounted components interconnected to form the circuits corresponding to the diagram represented on the face of panel 3, as well as additional circuits of the apparatus to be described. It will be apparent that by this arrangement the actual circuits corresponding to the circuits depicted on the display panel may be readily removed for repair and maintenance, or may be replaced by other circuits so that the apparatus may be kept up to date and representative of current practice at a minimum of expense.

A drawer 7 is preferably provided in the apparatus to contain a board on which circuits can be temporarily set up, together with a selection of circuit components and conventional connecting means for this purpose, a set of patch cords for setting up desired circuit combinations on the panel, an external cable connector, and a student's instruction manual.

Figure 3:
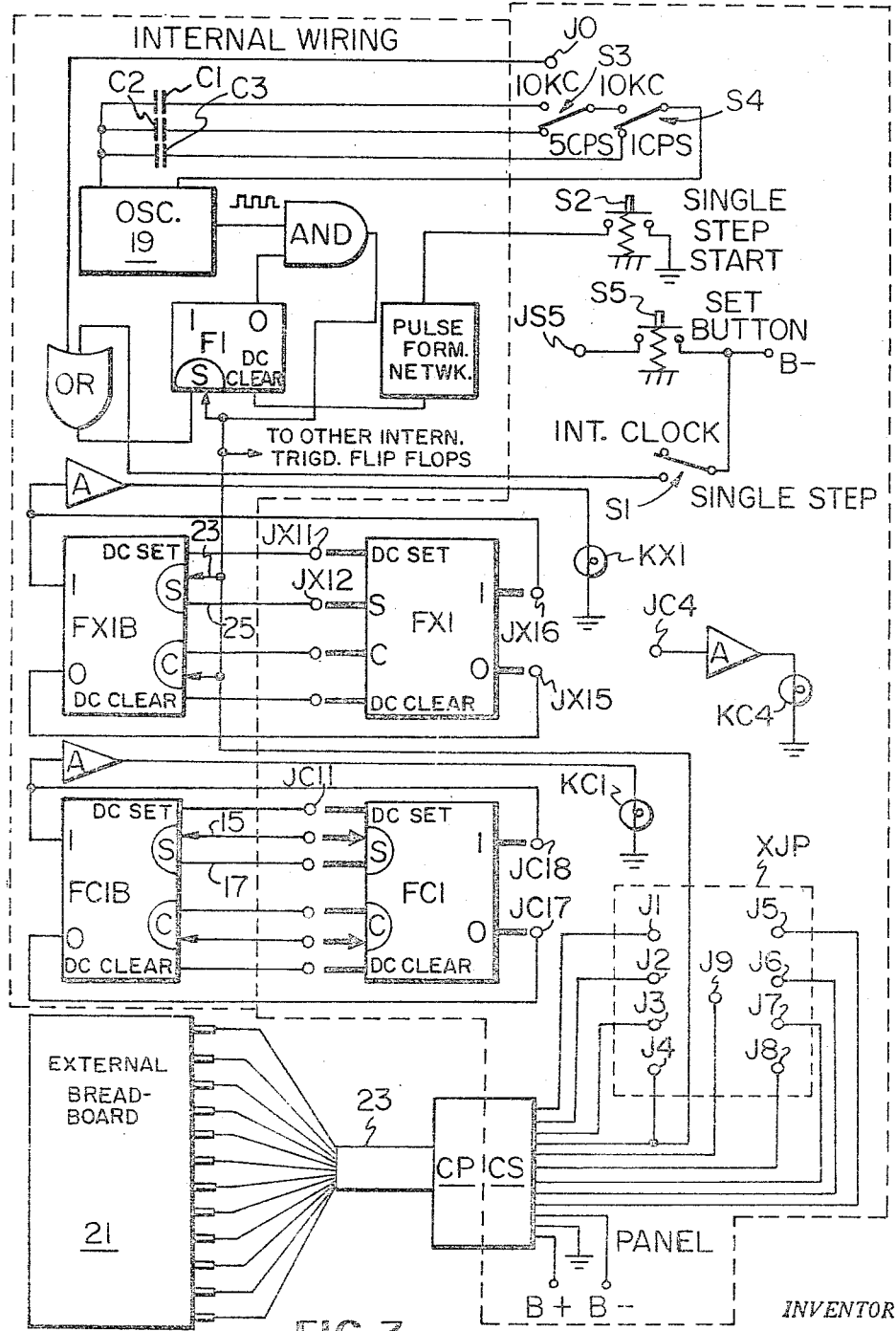
FIG. 3 is a schematic wiring diagram of a portion of the apparatus of FIG. 1.

Referring now to FIG. 3, the manner in which the apparatus of FIG. 1 is connected is illustrated in detail. In FIG. 3, jacks on the panel have been represented as small circles and the representation of leads on the panel have been indicated by heavy lines stopping short of the circle to indicate that the connection is graphic rather than electrical. Circuit connections for only two of the flip-flops have been shown, but it will be understood that the other flip-flops and gates are similarly connected. Since the actual circuits corresponding to the logic circuits depicted on the panel are conventional and of well known construction, they have not been shown in detail but have been shown by the same symbols used to depict them on the board. The actual circuits have been further distinguished from their graphical representations by the addition of the suffix B to their reference characters. Thus, the actual flip-flop corresponding to the represented flip-flop FC1 is labelled FC1B, and the actual circuit corresponding to the represented flip-flop FX1 is shown as FX1B. As indicated, both the C flip-flops such as FC1B and the X, Y and Z flip-flops such as the flip-flop FX1B may be of the same actual construction. Thus, they may comprise conventional gated flip-flops having a direct set input labelled "DC set," which will set the flip-flop to its logic 1 state when a negative potential is applied to that terminal, a direct clearing terminal labelled "DC clear," which similarly allows the flip-flop to be cleared by an applied negative level, and a pair of set terminals S and a corresponding pair of clear terminals C. One terminal of each of these pairs, such as the terminal 15 for the flip-flop FC1B, is shown with an arrow, and the other, such as the terminal 17 of the flip-flop FC1B, is shown without an arrow. The terminals such as 15 correspond to the triggering terminals of the flip-flop, and the terminals such as 17 correspond to gate input terminals. When a negative level is applied to the gate input terminal of one of the flip-flops, and a positive-going transition is applied to its trigger input terminal such as 15, the flip-flop will be set to the logic 1 state if the pair of terminals is the S pair, or to its logic 0 state if the pair of terminals thus energized is the C pair. In the logic 1 state, the output terminal labelled 1 will be at a negative potential, with the output terminal labelled 0 being at ground potential, and in the logic 0 state of the flip-flop the opposite output terminal conditions will prevail. Power supply connections are made to the flip-flop in a conventional manner, not shown. The input and output terminals of the flip-flops are each connected to corresponding jacks on the terminal board. Thus, the DC set terminal of the flip-flop FC1B is connected to the jack JC11, and the trigger input terminal 15 is connected to the jack JC12. The logic 1 output terminal of each of the flip-flops such as FC1B is connected to a corresponding indicator lamp such as KC1 on the panel 3. Thus, it is apparent that each such lamp will be lit when the corresponding flip-flop is in its logic 1 state.

The X, Y and Z flip-flops are arranged to be automatically stepped by clock pulses. Thus, their representations such as FX1 in FIG. 2 show only four input terminals. The triggering input terminals, as indicated on the flip-flop FX1B, are connected together to a common line which is at times supplied with pulses from an oscillator 19, and at other times supplied by single pulses from the push-button S2.

The oscillator or clock 19 may be of any conventional construction, and is preferably equipped with shaping circuits for producing an output train of square pulses at several different repetition rates. While various conventional techniques for changing the output frequency of the oscillator may be employed, as shown the oscillator is provided with three timing capacitors C1, C2 and C3, selectively connectable in the timing circuit of the oscillator to produce pulses at a 10 kilocycle per second rate, a 5 cycle per second rate, or a 1 cycle per second rate.

The oscillator may be arranged to be turned on and off by any conventional means, but as here shown has an output terminal connected to one input terminal of a conventional AND gate. The And gate is at times enabled by a flip-flop F1, to be described, to gate the output of the oscillator to the system. The flip-flop F1 may be of any suitable conventional design for producing a negative output voltage at its logic 1 output terminal when set to the logic 1 state and a ground potential when set to the logic 0 state, and corresponding opposite potentials at its logic 0 output terminal. The ground potential may be employed to inhibit the output of the oscillator 19 by disabling the AND gate, and the negative potential at the logic 0 terminal may be used to permit operation of the oscillator in the system. As indicated, the flip-flop F1 is reset to its logic 0 state, permitting operation of the oscillator in the system by a pulse from a conventional pulse forming network in response to a momentary depression of the single step start push-button S2. The flip-flop F1 may be set to disable the AND gate either by a negative voltage applied to the jack J0 on the panel 3, or by the first clock pulse in the system when the switch S1 is in the single-stepped position, signal levels for this purpose being provided by a conventional OR gate.

As shown, the output rate of the oscillator 19 to be applied to the trigger input terminals of the X, Y and Z flip-flops is selected by the position of the two switches S3 and S4. With both switches in their 10 kc. positions, and the switch S1 in its "internally clocked" position, pulses at a 10 kilocycle per second rate are supplied to the trigger terminals, causing the X, Y and Z flip-flops to be triggered at a rate simulating actual computer operating rates. With the switch S4 in its 10 kc. position and the switch S3 in its 5 C.P.S. position, the flip-flops are triggered at a 5 cycle per second rate. With the switch S4 in its 1 C.P.S. position, the X, Y and Z flip-flops are triggered at a 1 cycle per second rate. It will be noted that when the apparatus is started, the oscillator 19 will not begin to supply pulses until the single step start push-button S2 has first been depressed and released. With the switch S1 in its "single stepped" position, single triggering pulses may be supplied by the push-button S2 to cause the flip-flops to be triggered a single time to provide for step-by-step operation.

As shown in FIG. 3, an external breadboard 21 may be connected to the apparatus by means of a cable 23 terminating in a connector plug CP and provided with a number of leads equal to the number of pins on the connector plug CP for plug or clip connection to the components mounted on the breadboard 21. In a preferred embodiment, twelve external leads were provided, and the connector plug CP and connector socket SC were accordingly provided with twelve terminals. Of these, three terminals are connected to the positive terminal B(+), the negative termina B(−), and the ground terminal of the power supply, and the remaining nine terminals are connected to the external jacks J1 through J9, with the jack J4 being connected to the clock or oscillator pulses.

The apparatus of my invention having been described, I will next describe its operation in a typical training situation. Specifically, assume that it is desired to illustrate the operation of a ring counter. For this purpose, the flip-flops FX1 through FX4 are employed, and are interconnected by patch cords 5 in the manner shown in FIG. 1. Before plugging in the patch cords, the switch S1 is placed in its "single stepped" position. Next, a 1 is set into the flip-flop F1X by connecting a patch cord between the jack JS5 and the DC set input jack JX11, and then depressing and releasing the set button S5. The same patch cord from the jack JS5 is used to set a 0 in each of the flip-flops FX2, FX3 and FX4, by sequentially connecting the patch cord to their DC clear input terminals (see the labelled terminals for the flip-flop FX1 in FIG. 3) and depressing the set button S5 once for each setting. At this stage, the lamp KX1 will be lit and the other lamps will be extinguished, graphically indicating to the student the state of the circuits involved. Next, the student is instructed to press the step-start push-button S2 one time. The lamp KX1 will be put out, the lamp KX2 will be illuminated, and the lamps KX3 and KX4 will remain extinguished. This illustrates the operation of the ring counter in transferring a 1 in the flip-flop FX1 to the flip-flop FX2 and transferring the 0's in the other flip-flops to the succeeding flip-flops in the ring. The start button S2 is then to be depressed a second, third and fourth time. After each depression of the button S2, the 1 will be shifted one stage to the right, such that after the third depression of the button S2, the lamp K4X will be lit and all the rest will be extinguished, and at the fourth operation, the 1 will be transferred from FX4 back to FX1 and the apparatus will be in its initial condition. Comparing FIGS. 1 and 3, it will be seen that with the flip-flop FX4 in its logic 1 state, and its logic 1 output terminal connected over the patch cord 5 to the set input terminal of the flip-flop FX1, the flip-flop FX1 would be in its logic 0 state with a negative potential applied to its input gate terminal 23. When the single step start push-button S2 is depressed for the fourth time in the example given, a negative trigger transition will be applied from the switch S2 to the trigger input terminal 25 of the flip-flop FX1B and set the flip-flop to its logic 1 state.

Having seen the operation of the ring counter a step at a time, the student can then be instructed to set the switch S1 to its "internally clocked" position and to set the switch S3 to its 10 kc. position and the switch S4 to its 1 c.p.s. position. When the single step start button S2 is then depressed, the flip-flop F1 will be reset and the oscillator 19 will produce pulses at the rate of one pulse per second to cause the ring counter to cycle as before, but automatically and at a rate which can easily be followed. The switch S4 may then be set to its 10 kc. position and the switch S3 to its 5 c.p.s. position, and a depression of the start button S2 will then cause the apparatus to cycle at the 5 cycle per second rate. Next, both the switches S3 and S4 may be put in their 10 kc. positions, and the single step start switch S2 depressed. The oscillator will then trigger the ring counter at the rate of 10 kilocycles per second, and the student may observe operation by connecting an oscilloscope to either the logic 1 or the logic 0 output jacks of any one of the flip-flops FX1 through FX4. He will then be led to associate the actual operation of the circuit in a step-wise fashion with the observed waveform on the oscilloscope.

Once the oscillator 19 has been started in the manner described above, it may be turned off either by turning the main switch S6 to its off position, or by applying a negative potential to the panel jack J0.

Having described the operation of the apparatus of my invention in a typical training situation, its use in other training situations will be apparent to those skilled in the art without further description. In conjunction with the operation of the apparatus including an external circuit wired on the breadboard 21, alone or in combination with one or more of the circuits depicted on the panel 3, it will be apparent that the spare indicating lamp KC4 may be used to observe the state of a circuit either represented on the panel or mounted on the external breadboard, by patch cord connection of the associated jack JC4 with the desired jack on the panel.

While I have described my invention with reference to the details of a specific embodiment thereof, many changes and variations will be apparent to those skilled in the art upon reading my description, and such can obviously be made without departing from the scope of my invention.

Having thus described my invention, what I claim is:

1. A digital computer trainer, comprising a display panel, a group of jacks mounted on said panel, a set of gate circuit diagrams on said panel, a set of triggerable memory circuit diagrams on said panel, each of said diagrams including input and output terminal designations each associated with a different one of said jacks, a circuit card connector rack mounted adjacent said panel, a plurality of circuit cards detachably mounted in said rack, gate circuits and memory circuits mounted on said cards, said circuits each corresponding to a different one of said diagrams and having input and output terminals connected to associated ones of said jacks, an indicator lamp for each circuit diagram mounted on said panel in a labelled array, circuit means for each lamp controlled by a different one of said circuits for energizing the lamp in a predetermined state of the associated circuit, triggering means connected to each memory circuit for enabling operation of the circuit in a manner determined by the potentials applied to the jacks connected to its input terminals once for each clock pulse applied to said triggering means, oscillating means selectively actuable to produce clock pulses at a first and a second rate, said first rate being countable by a human observer and said second rate simulating a practical computer clock rate, a manually actuable source of single clock pulses having an actuating element mounted on said panel and labelled to indicate its function, manually operable switching means having a first state connecting said oscillating means to said triggering means and a second state connecting said manually actuable source to said triggering means, said switching means having an actuating element mounted on said panel and labelled to indicate its function, and a set of patch cords for interconnecting said jacks to form a circuit combination graphically displayed on said panel and operable in response to manipulation of said actuating elements in a manner depicted by the pattern and sequence of illumination of said lamps.

2. Training apparatus, comprising a display panel, a series of diagrams inscribed on said display panel, each diagram representing a logic circuit and indicating selected input and output terminals of the circuit, a jack mounted in said panel adjacent each terminal indication, a plurality of electrical logic circuits corresponding to the circuits represented by said diagrams mounted adjacent said panel, said circuits having external terminals corresponding to the terminals associated with said jacks and each terminal being connected to the corresponding jack, a set of patch cords for selectively connecting any selected group of said circuits into any of a predetermined set of relationships to produce operation when energized in accordance with a predetermined set of modes, adjustable clock means operatively connected to said circuits for producing clock pulses to cause operation of the interconnected circuits in the selected mode at a rate determined by the extent of adjustment of said clock means for energizing the circuits selected by said patch cords, and indicating means responsive to the potentials at selected points in said circuits for indicating the states of the circuits.

3. Training apparatus, comprising a display panel, a plurality of electrical block diagrams of circuits inscribed on said panel, each diagram including a representation of selected terminals of the circuit represented by the diagram, a jack mounted on said panel at the location of each such terminal representation, electrical circuits corresponding to each block diagram represented on the display panel and having terminals connected to corresponding jacks on said panel, triggering means for enabling each circuit to operate once for each clock pulse in a manner dependent on the potentials of the associated jacks, a clock oscillator selectively conectable to produce one of a plurality of different output frequencies, switching means for selectively connecting said oscillator to produce any selected one of its output frequencies, first switching means operable to connect said oscillator to apply clock pulses to said triggering means, a multiple terminal two part connector having one part mounted on said panel and a second part adapted to be connected to said first part, a plurality of external leads connected to said second part, breadboard means for temporarily constructing an electrical circuit, means for connecting said external leads to terminals of a circuit constructed on said breadboard means, a plurality of jacks mounted on said panel and connected to the terminals of said first part, and a plurality of indicating lamps each connected to a different selected one of the group comprising terminals of said electrical circuits and the terminals of said connector, whereby a plurality of circuits may be formed by interconnecting selected jacks with patch cords to form a system operating at a selected clock rate in a sequence indicated by the state of said lamps.

4. Training apparatus, comprising a display panel, a series of printed circuit connectors mounted adjacent said panel, a printed circuit card carrying a triggerable electrical circuit having a predetermined number of terminals mounted on each of said connectors, a diagram of each of the circuits on said cards inscribed on said panel, each diagram indicating selected terminals of the diagrammed circuit, a jack located on said panel adjacent to each terminal indication, each jack being connected to the corresponding terminal on the circuit board containing the diagrammed circuit through the associated connector, a plurality of indicator means each connected to a different one of a corresponding plurality of terminals in said circuits for indicating the potentials of the terminals with respect to a reference potential, a set of patch cords for interconnecting said jacks to form circuit combinations, triggering means for triggering said circuits at a rate dependent on the rate of application to said triggering means of a stream of clock pulses, a manually operable source of single clock pulses, a source of periodic clock pulses selectively actuable to produce pulses at a plurality of rates including a low rate countable by a human observer, and manually operable switching means having a first state in which said manually operable source is connected to said triggering means and a second state in which said periodic clock pulse source is connected to said triggering means.

5. Training apparatus, comprising a display panel, a group of diagrams of logic circuits inscribed on said panel, each diagram being labelled with an indication of the structure and function of the circuit represented in terms of a predetermined set of conventions and with coordinates determined by the position of the diagram in the group, an indicator lamp mounted on said panel for each diagram, labels adjacent said lamps associating each lamp with a different one of said diagrams in terms of said coordinates, a set of jacks mounted on said panel adjacent each diagram and labelled to associate the jacks with input and output terminals of the circuits represented by the diagrams, a group of electrical circuits detachably mounted adjacent said panel, said circuits each corresponding to a different one of said diagrams and having input and output terminals detachably connected to the jacks associated with corresponding terminals by said diagrams, circuit means connecting one terminal of each circuit to a different one of said lamps to energize the lamps in predetermined states of the circuits, triggering means connected to a plurality of said circuits for causing operation in accordance with the function represented by the diagram when and only when a clock pulse is applied to said triggering means, oscillator means settable to a plurality of states for producing clock pulses at a different rate in each state including at least a first rate low enough to be countable by a human observer and at least a second rate substantially greater than said first rate, first manually operable switching means having a plurality of states corresponding to the states of said oscillator means for setting said oscillator means to a selected one of its states, a manually operable push-button, means controlled by said push-button for producing a clock pulse each time the bush-button is depressed, second manually operable switching means having first and second states for applying pulses to said triggering means from said oscillator in its first state and applying pulses to said triggering means from said push-button in its second state, said switching means and said push-button having actuating elements mounted on said panel and labelled to indicate their functions, a spare indicator lamp and an associated jack mounted on said panel, circuit means connecting said associated jack to said spare lamp for energizing the lamp when a predetermined potential is applied to said jack, a set of external circuit jacks mounted on said panel and labelled with identifying indicia, breadboard means for temporarily setting up an electrical circuit, cable means for connecting selected terminals of a circuit set up on said breadboard means to said external circuit jacks, and a set of patch cords for interconnecting jacks on said panel to form graphically displayed combinations of circuits operable by manipulation of said switching means and said push-button step-wise and at said first and second rates in dependence on the states of said switching means, the operation being observable by the pattern and sequence of illumination of said lamps.

References Cited by the Examiner

UNITED STATES PATENTS

| | | | |
|---|---|---|---|
| 1,968,039 | 7/1934 | Hornberger | 35—19 |
| 2,788,470 | 4/1957 | Giel et al. | 35—19 X |
| 3,043,022 | 7/1962 | Crews et al. | 35—19 |
| 3,061,945 | 11/1962 | Hawkins | 35—13 |
| 3,078,596 | 2/1963 | Sweeton | 35—19 |
| 3,146,533 | 9/1964 | Carmody et al. | 35—10 |
| 3,162,960 | 12/1964 | Elmlinger | 35—30 |
| 3,175,304 | 3/1965 | Och et al. | 35—19 |

EUGENE R. CAPOZIO, *Primary Examiner.*

S. M. BENDER, *Assistant Examiner.*